United States Patent
Brower

(10) Patent No.: US 9,302,826 B2
(45) Date of Patent: Apr. 5, 2016

(54) SPOUT APPARATUS, SYSTEMS AND METHODS

(71) Applicant: Capton, Inc., Irvine, CA (US)

(72) Inventor: Charles J. Brower, Irvine, CA (US)

(73) Assignee: Capton, Inc., Irvine, CA (US)

( * ) Notice: Subject to any disclaimer, the term of this patent is extended or adjusted under 35 U.S.C. 154(b) by 5 days.

(21) Appl. No.: 14/209,956

(22) Filed: Mar. 13, 2014

(65) Prior Publication Data

US 2014/0263422 A1     Sep. 18, 2014

Related U.S. Application Data

(60) Provisional application No. 61/780,150, filed on Mar. 13, 2013.

(51) Int. Cl.
| | |
|---|---|
| *B65D 47/06* | (2006.01) |
| *B67D 3/00* | (2006.01) |
| *G01F 1/00* | (2006.01) |
| *G01F 13/00* | (2006.01) |
| *G01F 15/02* | (2006.01) |
| *G01F 15/06* | (2006.01) |

(52) U.S. Cl.
CPC .............. *B65D 47/06* (2013.01); *B67D 3/0051* (2013.01); *G01F 1/00* (2013.01); *G01F 13/006* (2013.01); *G01F 15/024* (2013.01); *G01F 15/063* (2013.01); *B67D 3/0041* (2013.01)

(58) Field of Classification Search
USPC ..................... 222/23, 566, 567, 569
See application file for complete search history.

(56) References Cited

U.S. PATENT DOCUMENTS

| | | |
|---|---|---|
| 4,327,784 A | 5/1982 | Denniston |
| 4,736,871 A | 4/1988 | Luciani et al. |
| 5,279,481 A | 1/1994 | Trotter et al. |
| 5,379,916 A | 1/1995 | Martindale et al. |
| 6,892,166 B2 | 5/2005 | Mogadam |
| 7,003,406 B2 | 2/2006 | Mogadam |
| 7,260,504 B2 | 8/2007 | Mogadam |
| 7,272,537 B2 | 9/2007 | Mogadam |
| 7,573,395 B2 * | 8/2009 | Morrison et al. ............. 340/689 |
| 7,750,817 B2 * | 7/2010 | Teller ............................ 340/666 |
| 7,900,799 B2 | 3/2011 | Kuzar et al. |
| 8,608,026 B1 | 12/2013 | Temko et al. |
| 8,961,781 B2 * | 2/2015 | Ma et al. ......................... 210/87 |
| 2005/0200490 A1 | 9/2005 | Teller |
| 2009/0048706 A1 | 2/2009 | DeLine |
| 2011/0180563 A1 | 7/2011 | Fitchett et al. |
| 2014/0319170 A1 * | 10/2014 | Sweeney et al. ............... 222/23 |

* cited by examiner

*Primary Examiner* — Donnell Long
(74) *Attorney, Agent, or Firm* — Fish & Tsang, LLP

(57) ABSTRACT

A spout is disclosed capable of detecting if it is properly "on" or "off" the container according to tilt characteristics of the spout as determined by accelerometer and other sensor data. The tilt characteristics can be applied to one or more sets of coupling criteria, which if met, can provide an indication that the spout is "on bottle" or "off bottle".

18 Claims, 4 Drawing Sheets

SPOUT APPARATUS, SYSTEMS AND METHODS

This application claims priority to U.S. Provisional Application No. 61/780,150, filed Mar. 13, 2013. U.S. Provisional Application 61/780,150 and all other referenced extrinsic materials are incorporated herein by reference in their entirety.

FIELD OF THE INVENTION

The field of the invention is dispensing technologies.

BACKGROUND

The following description includes information that may be useful in understanding the present invention. It is not an admission that any of the information provided herein is prior art or relevant to the presently claimed invention, or that any publication specifically or implicitly referenced is prior art.

Measuring liquor poured and controlling liquor costs is critical in the hospitality industry. Some spouts are designed to measure liquor poured and report it, and there are some spouts that control the amount poured and report that. In order for either of these types of spouts to be effective, there must be a way of monitoring that a monitoring spout is in fact attached or properly attached to the dispenser.

The technology used until now has involved mechanical switches and magnetic proximity switches. Both of these work by having a spring-loaded button or stem or circular "washer" that protrudes from the bottom of the spout. When the spout is inserted into the bottle, the button/stem/washer is pressed closer to the spout body, and this closes some contacts or activates a proximity switch. Unfortunately, there are numerous mechanical problems with such approaches.

First, the spouts typically are not fully inserted, or they work their way partly out of the bottle with use. This is not a problem with a standard spout; as long as it doesn't leak, it is in far enough. However, the detect mechanism reports the spout as off bottle when the spout is not fully inserted. In addition to a false off-bottle signal, this typically also puts the spout to sleep and no data is transmitted.

Second, the mechanical switches tend to clog and fail with time.

Third, in the case of a button or stem closing some contacts, the button forms an opening for liquids to get into the spout body and corrupt the electronics or drain the battery.

Fourth, but by no means last, the mechanical contact closing or proximity switch adds complexity and cost.

Some effort has been applied toward using sensors to measure an amount of material dispensed. Co-owned U.S. patent application having Ser. No. 12/688,839 to Temko titled "Methods, Apparatus, and Systems for Measuring the Amount of Material Dispensed from a Container Using an Accelerometer", filed Jan. 15, 2010 and issued as U.S. 8,608,026. However, Temko fails to appreciate that sensor data can be used to detect a spout coupling status. Additional co-owned work is disclosed in U.S. Pat. Nos. 6,892,166 to Mogadam titled "Method, Apparatus, and System for Monitoring Amount of Liquid Poured from Liquid Containers", filed Mar. 8, 2002; 7,003,406 to Mogadam titled "Method, Apparatus, and System for Monitoring Amount of Liquid Poured from Liquid Containers", filed May 13, 2004; 7,260,504 to Mogadam titled "Method, Apparatus, and System for Monitoring Amount of Liquid Poured from Liquid Containers", filed Jan. 9, 2006; and 7,272,537 to Mogadam titled "Spout for Dispensing Liquid from a Liquid Container", filed May 13, 2004.

Further progress is made by U.S. patent application publication 2005/0200490 to Teller titled "Service Transaction Monitoring System, Method and Device", filed Nov. 18, 2004. Teller describes a sensor device attached to a bottle that merely detects, in a binary fashion, if it is on or off a bottle. However, the sensor device is not part of a spout nor provides a spout coupling status. Additionally, the detection of the removal of the sensor is not associated with any kind of angular measurements.

U.S. patent application publication 2011/0180563 to Fitchett, et al, titled "Dispensing Monitor", filed Jan. 27, 2011, describes analyzing a waveform of acceleration or other movement detected by a sensor to determine whether a removal has taken place. Fitchett lacks discussion regarding any specificity as to what is analyzed within the waveform, such as how a removal is distinguished from a simple pick-up and jiggle of the container. Fitchett similarly lacks discussion as to whether angles and/or timed intervals are ever used in determining a removal or engagement of the sensor to the container.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for spouts capable to determine their own coupling status with respect to a container.

SUMMARY OF THE INVENTION

The inventive subject matter provides apparatus, systems and methods in which a one can utilize a spout capable determining if the spout is properly coupled with a container. One aspect of the inventive subject matter includes a spout with a tilt sensor and a detector circuit. The tilt sensor (e.g., an accelerometer, magnetometer, etc.) can generate a signal representative of a tilt profile, possibly relative to a vertical position. The detector circuit compares the tilt profile to spout coupling criteria defined as a function of sensor information or other tilt profile attributes. If the coupling criteria is satisfied by the sensor data (e.g., tilt angle, time, profile, acceleration, etc.), then the detector circuit can generate a coupling status message that can report the coupling status of the spout (e.g., on-bottle, off-bottle, flow rate, etc.). The message can be transmitted to one or more external devices, such as a central computer system, via a wireless interface or other communication interface.

One should appreciate that the systems and methods of the inventive subject matter provide various technical effects, including the monitoring of a dispensing spout's attachment to a container without requiring the incorporation of mechanical contacts or proximity switches into the spout. Thus, the complexity, cost and risk of failure of the spout's coupling monitor functions are reduced while improving the accuracy of the detected status.

The system of the inventive subject matter can include an accelerometer within a spout that can detect the crossing of a threshold angle and output a signal interrupt to a microprocessor.

The system can also include a microprocessor that, prior to receiving an interrupt signal, is kept in a sleep state. Upon receiving the interrupt signal from the accelerometer, the microprocessor can be awoken and determine whether the interrupt signal received is in response to crossing a threshold angle that places the spout in a tilt state or in an untilted state.

Upon determining a tilt state, the microprocessor can measure the duration that the spout remains in a tilted state. In embodiments, the system can include a clock used to measure the time elapsed. If the duration exceeds a threshold duration time, the spout can determine that the spout is "off-bottle" and generate a spout coupling status message indicating "off-bottle status"

The system can include a transmitter (such as an RF transmitter) and an antenna, whereby the spout coupling status message can be transmitted to external devices, such as a central computer.

In embodiments, the spout coupling criteria can be used to detect an off-bottle condition reflective of the spout being removed and placed on a flat surface (such as when switching from an empty bottle to a new bottle), by monitoring whether the spout remains within a narrow angle range from horizontal for a relatively short duration of time.

In embodiments, the microprocessor can return to sleep mode after sending a coupling status message, changing a coupling status, determining an "on-bottle" or "off-bottle" status (such as when no message is required), returning to an untilted state, or after finishing other functions of the microprocessor according to the inventive subject matter.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The disclosed approach leverages an accelerometer to measure liquor flow. By characterizing flow rate vs. angle, the accelerometer can be used to perform a numerical integration that can be used to calculate a total amount of liquor poured. Further, the accelerometer, or other tilt detector, to detect on-bottle and off-bottle conditions (e.g., a spout coupling state), thereby eliminating the issues described above.

Figure 1:
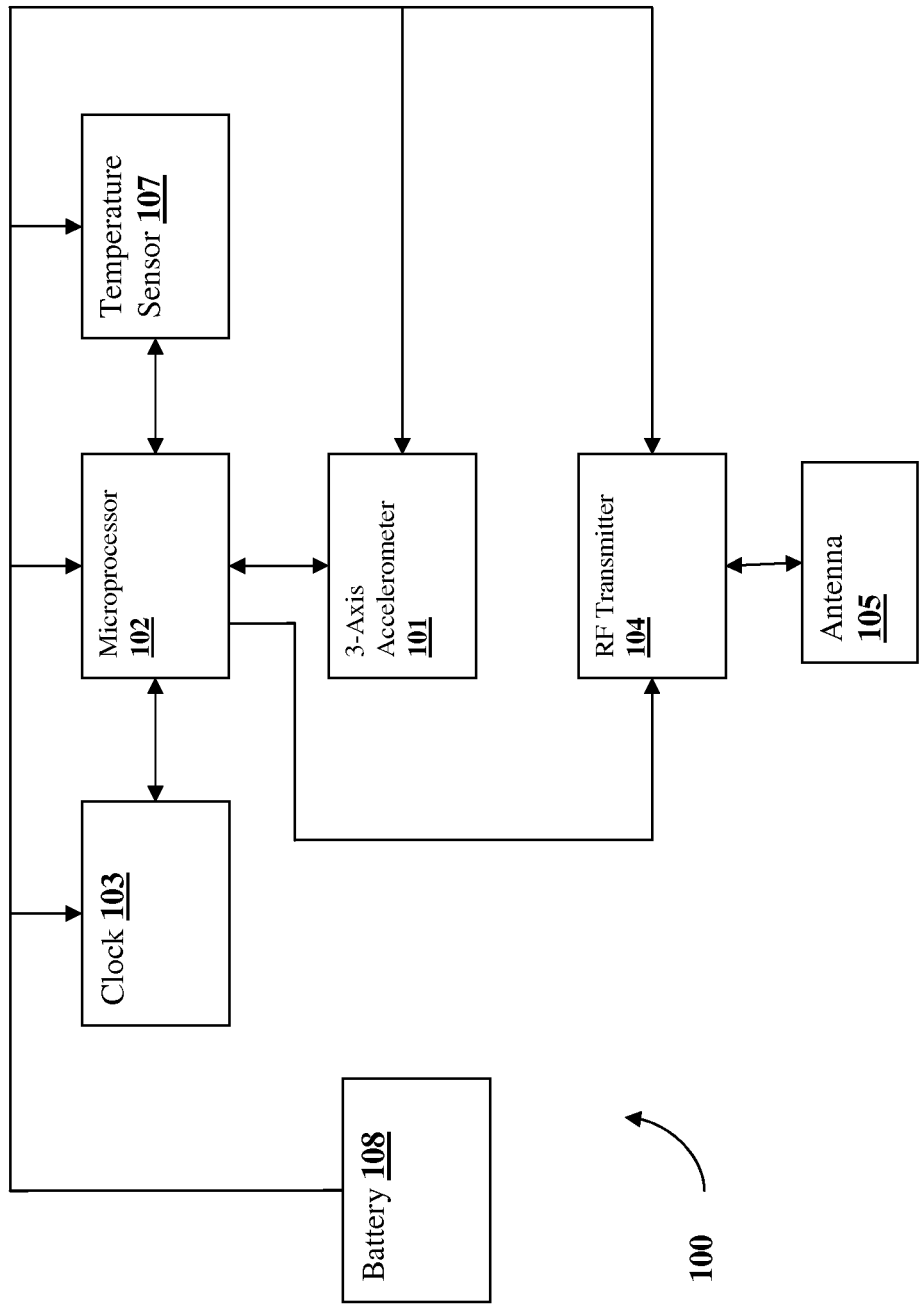
FIG. 1 is a sample schematic for a spout tilt detector system.

FIG. 1 provides an illustrative example of a detector circuit 100 comprising the spout tilt detector system. As shown in FIG. 1, the detector circuit can use the tilt sensor data to determine if the spout is "vertical". If so then the spout is considered coupled, or "on-bottle". "Vertical" can being at an angle that is less than a pre-defined threshold (for example, within 15 degrees of vertical). If the spout goes away from vertical and remains so for more than a threshold time value (for example, more than 25 second), then the spout is considered to have a spout coupling state that is not coupled, or "off-bottle". The off-bottle and on-bottle conditions can be transmitted to a receiver for external monitoring via a wireless transmitter. In embodiments, the wireless transmitter adheres to one or more standards, possibly including 802.11, Bluetooth, Zigbee, WiMAX, WiGIG, 6LoWPAN, RFID, or other wireless transmitting standard technologies. Still, in other embodiments the wireless transmitter can leverage a proprietary serial format, possibly based on RS-232. Such an approach can be advantageous to leverage legacy receivers or consume less power than more consumptive technologies. For example, the wireless transmitter can transmit a simple amplitude-modulated carrier (e.g., on-off keying) to convey information to the receiver. Also, a proprietary format can be a one-way format, such that the spout transmits a message (which can include repeating the message transmission at least once to ensure successful transmission), and then goes back to sleep. This eliminates the need for added components in the spout (e.g., receivers for handshaking protocols, etc.), reducing cost, complexity, and power requirements of the spout.

It is contemplated that the systems and methods of the inventive subject matter can be implemented via spouts that use accelerometers for the purposes of monitoring pour events and amounts of material poured. Examples of this kind of pour-measurement spout include co-owned U.S. Pat. No. 8,608,026 and U.S. patent application Ser. No. 14/099,865, both to Temko, et al, both of which are incorporated herein by reference in their entirety.

As shown in FIG. 1, the system 100 includes an accelerometer 101, a microprocessor 102, a clock 103, an RF transmitter 104 and antenna 105, and a battery 107. In embodiments, the system 100 can also include a temperature sensor 107, and other sensors (e.g., magnetometers, proximity sensors, gyroscopes, etc.). The components of system 100 can be connected as shown via a common connection to a circuit board. In embodiments, the system 100 can also include memory, which can be used to store instructions and other data associated with processes of the inventive subject matter.

The system 100 can be communicate with a central computer system, such as a tracking system, via the RF transmitter 104 and antenna 105, or via other wired or wireless communication. The central computer system can include a user interface (e.g., screen, speakers, keyboard, mouse, touchscreen, etc.) that allow a user to input data into the system and to provide output to the user (e.g., via report screens providing information about the system 100). The central computer system can send data to the system 100, such as spout coupling criteria, assignment information associated with an assigned spout (e.g., assigning a spout to a bottle or type of material being dispense, including container and material properties, etc.) provide firmware and software updates, etc. The central computer system, in turn, can receive information from the system 100, such as spout coupling status messages that provide the status of the spout (e.g., "on-bottle" or "off-bottle").

The accelerometer 101 can be a micro-electromechanical system (MEMS), capable of detecting acceleration and angle along three axes. Speed and angle can be determined by integrating acceleration over time. The accelerometer 101 can be programmed to conduct periodic measurements of the spout's angle, according to a set measurement/detection frequency. The accelerometer 101 can also be programmed to output an interrupt signal to the microprocessor 102. In embodiments, the interrupt signal can have a plurality of states, whereby the state of the interrupt signal can be dependent on the measured angle of the spout relative to one or more threshold angles. In these embodiments, the accelerometer 101 can be programmed to change the state of the interrupt signal upon detecting the crossing of a threshold angle. This can be accomplished in various ways. In one example, having the crossing of the threshold angle act as a trigger to permanently or temporarily change the interrupt signal state. In another example, the interrupt signal state change occurs because, upon crossing the threshold, the interrupt signal corresponding to sampled angles beyond the threshold corresponds is simply of a different state than the interrupt signal corresponding to the pre-threshold angles.

In embodiments, the accelerometer 101 can be programmed to send the interrupt signal based on a sensed acceleration due to movement, whereby the interrupts signal is sent based upon the acceleration exceeding a threshold acceleration along one or more axes.

Figure 2:
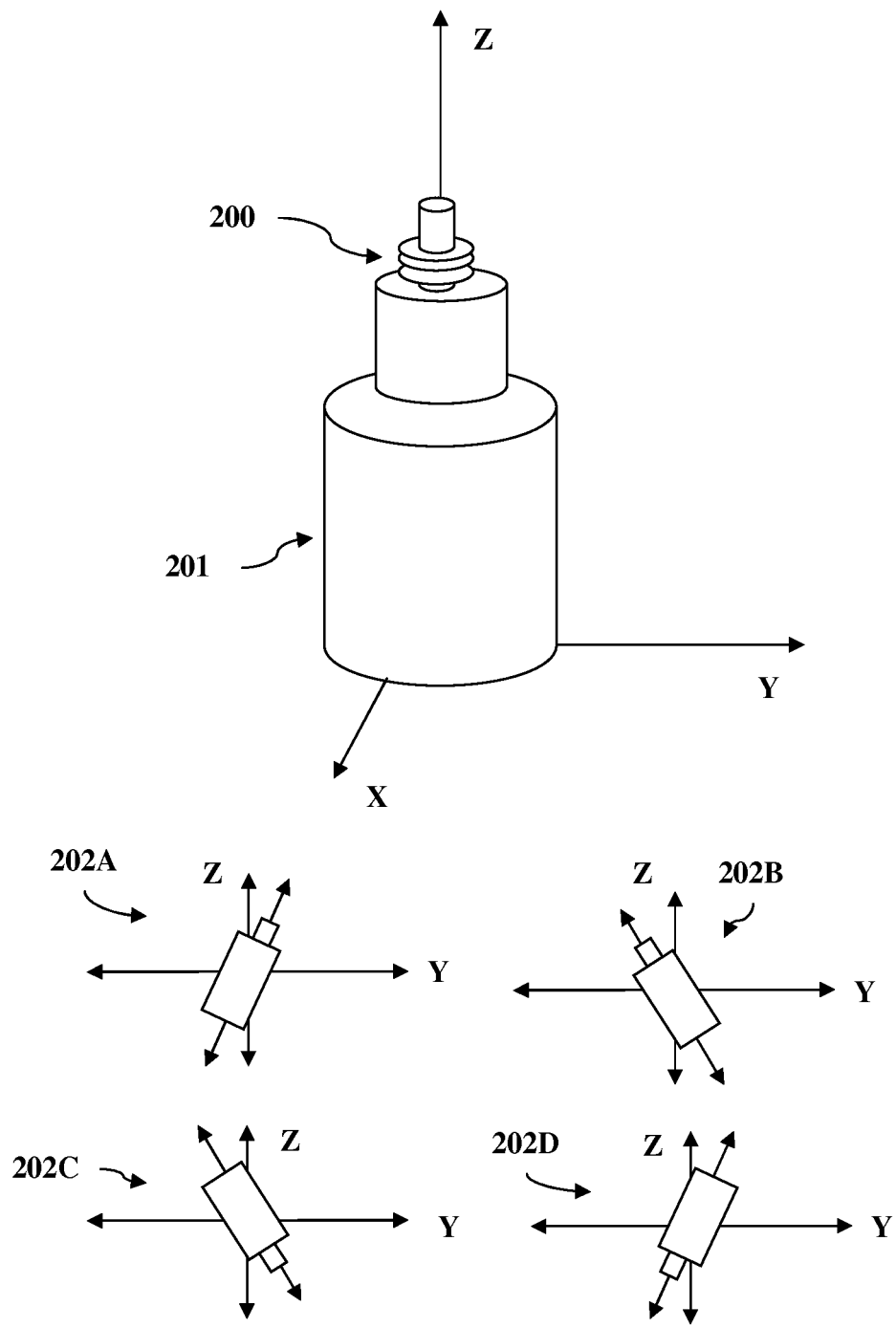
FIG. 2 provides an illustrative example of the spout attached to a bottle, the reference axes used by the spout in determining angles, and example diagrams of various bottle/spout orientations.

FIG. 2 provides an illustration of the spout 200, according to embodiments of the inventive subject matter, attached to a bottle 201, and also provides a labeling of the X, Y and Z axes. As shown in FIG. 2, the Z axis corresponds to a vertical direction. The accelerometer 101 is preferably a three-axis accelerometer capable of detecting the angle of the spout along an X, Y and Z axes. To do so, the accelerometer 101 contains detectors capable of detecting acceleration along each of the X, Y and Z axes. The acceleration detected can be based on movement of the spout or due to the Earth's gravitational field (allowing for the detection of an angle of a spout that is sitting still).

In preferred embodiments, the accelerometer 101 can use all three axes detectors in combination to detect the angle of the spout relative to vertical. When the spout is upright, as shown in FIG. 2, the Z-axis detector of accelerometer 101 detects 1 g (the acceleration due to the Earth's gravity). As the X- and Y-axis detectors are perpendicular to the direction of gravity, they both measure zero g. If the spout were to be rotated about the X axis, the magnitude of the acceleration sensed by the Z axis detector will decrease, and the magnitude of acceleration sensed by the Y axis will increase. Thus, if the spout were to be horizontal, the Z axis detector measures zero and the Y axis detector sense a magnitude of 1 g. Similarly, if the spout were to be rotated about the Y-axis, the measured magnitudes from Z- and X-axis detectors would change. As each detector is out of phase with the others by 90 degrees, the points at which they are most sensitive to change also are out of phase by 90 degrees.

Because the X- and Y-axes are on the horizontal plane, it is possible that a spout may be tilted and cross a threshold angle in both a positive axis and negative axis direction. As such, each of the X- and Y-axis detectors of the accelerometer 101 are configured to detect both positive and negative angles in their respective axis as magnitudes. For example, if the threshold angle is 45 degrees from vertical in any direction, then for each of the X- and Y-axes, the corresponding detector is programmed to detect a threshold angle of 45 degrees and 135 degrees (from vertical). In this example, the X- and Y-axis detectors will detect 45 degrees off horizontal as magnitudes. In another example, if the threshold is 20 degrees from vertical (corresponding to 70 degrees from horizontal), then the negative angle for that threshold would be 160 degrees from vertical (i.e., 20 degrees from vertical in the negative Z-axis direction). Because the angled measurements along the X- and Y-axes are of magnitudes, the do not distinguish between a positive angle and a negative angle in their respective planes. Therefore, the Z-axis detector is then used to verify the true orientation of the spout. Diagrams 202A-202D of FIG. 2 provide an illustration of possible orientations of a bottle according to this example, assuming a tilt having an angle of 70 degree off-horizontal. For the purposes of simplicity, the diagrams 202A-202D show a bottle (assumed to have a spout inserted, such as the spout 200 attached to bottle 201) tilted along the YZ plane, horizontally along the Y axis.

At 202A and 202B, the angle detected by the Y-axis detector is of a magnitude of 70 degrees from horizontal. The system then checks with the Z-axis detector, which returns the confirmation value of 20 degrees off-vertical, thus precisely determining the tilt and orientation of the spout (and thus, the bottle).

At 202C and 202D, the angle detected by the Y-axis detector is again a magnitude of 70 degrees from horizontal. Because the accelerometer is configured to provide angular measurements relative to a positive Z-axis direction and because the Y-axis detector only provides a magnitude of angle off-horizontal, the measured angle of the Z-axis detector is necessary to provide the true orientation of the spout/bottle. Thus, the Z-axis detector in 202C and 202D return an angle measurement of 160 degrees off vertical, which gives the true angle of orientation of the bottle as being nearly inverted relative to a default vertical orientation.

When the spout is tilted in a direction from vertical that horizontally does not precisely align with the X- and Y-axis detectors, the accelerometer 101 can measure the angle (and thus, whether an angle threshold has been crossed) based on the combination of measurements from the X- and Y-axis detectors.

In embodiments, the combination can also include measurements from the Z-axis detector, whereby the combination can be a combination of the three angular measurements by the three axes detectors. Alternatively, incorporating the Z-axis detector can be used in a combination with each of the X- and Y-axis detectors, such that three combinations of measurements are obtained: an X- and Y-axis combination, X- and Z-axis combination, and Y- and Z-axis combination. The three combinations can then be used to collectively determine an angle from vertical (e.g., via averaging, statistical grouping, etc.). The Z-axis detector by itself can also be used to confirm the true angle (and thus, the true orientation) of the spout.

In a variation of these embodiments, only the X- and Y-axis detectors are used to detect when the spout has crossed a threshold angle. When this occurs, the Z-axis detector is checked to verify the true angle of the spout. Also, because the X- and Y-axis detectors can measure angles along their positive and negative axis planes, the Z-axis detector is checked to confirm the true angle (and thus, the accurate orientation) of the spout.

In other embodiments, the accelerometer 101 can use only the Z-axis detector to detect the angle of the spout off vertical.

The microprocessor 102 can be programmed to detect whether the spout is "on bottle" or "off bottle", based on a tilt profile of the spout and a spout coupling criteria. The tilt profile of the spout can be considered to be the instant determination of the tilt state of the spout relative to a reference orientation.

The tilt profile of the spout can be made up of tilt profile attributes, which represent the characteristics of the tilt profile of the bottle. One should appreciate that the tilt angle can be considered to represent a portion of an overall tilt profile of the spout. The tilt profile attributes and/or spout coupling criteria can be derived from signals gathered from the accelerometer 101 and other sensor data. Examples of tilt profile attributes can include an absolute angle (e.g., the angle of the spout relative to vertical), a relative angle (e.g., an adjusted angle to account for when the Z-axis of accelerometer 101 within the spout housing is not aligned with the vertical plane, such as due to the accelerometer's placement within the spout housing or due to the placement of a spout on a bottle whose opening does not face straight upwards), a time, a duration, a derived value from acceleration, a velocity, a position, a movement path (e.g., a path the spout takes in space), and a movement signature (e.g., a characteristic movement possibly representative of a person using the spout). In embodiments, the spout can be assigned to a particular container and/or material being dispensed. In these embodiments, tilt profile attributes can also include information about a container and/or a material being dispensed. These attributes can include material type, material viscosity, material flow rate, container size, container weight, container capacity, an alcohol percentage, amount of material remaining (e.g., from last known measurement), etc.

The microprocessor 102 can generate a detected profile based on the tilt profile attributes available to it. For example, the detected tilt profile can include a current angle as determined by the accelerometer and a current time based on information obtained from a clock 103 or internally kept by the microprocessor 102. Instead of (or in addition to) the current time, the tilt profile can include an elapsed time since the microprocessor 102 was "woken up" from its sleep state, which can be gathered from the clock 103 or the microprocessor's own timekeeping functions. The detected tilt profile can also include a duration indicating how long the spout has been tilted at a certain angle or within a certain angle range.

The microprocessor 102 can be programmed to obtain spout coupling criteria. Spout coupling criteria can be considered to be a set of criteria that can be used to determine a spout coupling state of "on bottle" or "off bottle". The microprocessor 102 can make the determination of the spout coupling state based on whether the detected tilt profile satisfies spout coupling criteria. The microprocessor 102 can have more than one spout coupling criteria available to it, and as such, can select the spout coupling criteria to use based on the tilt profile attributes available to from the accelerometer 101 and other sources of data. For example, where a microprocessor 102 has the profile attributes of spout angle and a duration at a particular angle, the microprocessor 102 can obtain spout coupling criteria that uses these profile attributes to determine the spout's coupling state. It is also possible that multiple spout coupling criteria can be selected based on the same (or similar) collection of profile attributes. Extending the example, one spout coupling criteria using the profile attributes of angle and duration can include rules that determine a spout to be "off bottle" if the angle exceeds a certain angle from vertical (e.g., 15, 25, 45 degrees, etc.) for a particular duration (e.g., 30 seconds, etc.). A second spout coupling criteria can also use the same profile attributes of angle and duration, whereby the "off bottle" status is determined if the angle is within a particular narrow angle range (e.g., within 15 degrees of horizontal) for a corresponding duration (e.g., 10 seconds). In embodiments of this example, the microprocessor 102 can obtain both spout coupling criteria, as both fit the tilt profile attributes available to the system 100. In alternative embodiments of this example, spout coupling criteria fitting the same (or similar) tilt profile attribute sets can be prioritized according to a predefined hierarchy, whereby the spout coupling criteria is selected according to the hierarchy.

The spout coupling criteria can be obtained by the microprocessor 102 from a central system, which transmits the spout coupling criteria to the system 100 via the RF transmitter 104 and antenna 105. The transmission can be via 'push' transmissions from the central system, or can be requested by the microprocessor as needed. The spout coupling criteria can be stored in the internal memory of microprocessor 102 or in other memory on-board system 100.

The microprocessor 102 can further be programmed to determine a spout coupling state of the spout by determining to what extent the detected profile satisfies the spout coupling criteria (if at all). As noted in the example illustrated above, a spout coupling criteria can require that the angle of the spout exceed a threshold angle for a particular amount of time to determine an "off-bottle" state. If the detected profile satisfies both the angle and the time threshold, then the microprocessor 102 determines that the spout is "off bottle." If the detected profile does not satisfy both of these conditions, then the spout is determined to be "on bottle."

Having determined the spout coupling state of the spout, the microprocessor 102 can generate a spout coupling state message that includes the spout coupling state, which is transmitted to the central system. In embodiments, the generated spout coupling state can be stored locally within the memory of the microprocessor 102 or other memory within system 100. In embodiments, the microprocessor 102 can be programmed to generate and send the spout coupling state message every time the spout coupling state is determined. In other embodiments, the microprocessor 102 can be programmed to generate and send the spout coupling state message only when the spout coupling state has changed (i.e., from a previous state of "off bottle" to a new state of "on bottle", or from a previous state of "on bottle" to a new state of "off bottle"). In still other embodiments, the microprocessor 102 can be programmed to generate and send the spout coupling state message whenever the spout coupling state is determined to be "off bottle" (but not when the status is "on bottle"), or vice-versa.

In preferred embodiments, the system 100 of FIG. 1 can be internal to a pouring or dispensing spout used to pour a material from a container, such as a liquor bottle. In other embodiments, the spout tilt system of FIG. 1 can be encased in its own housing, external to the spout and attached thereto.

Figure 3:
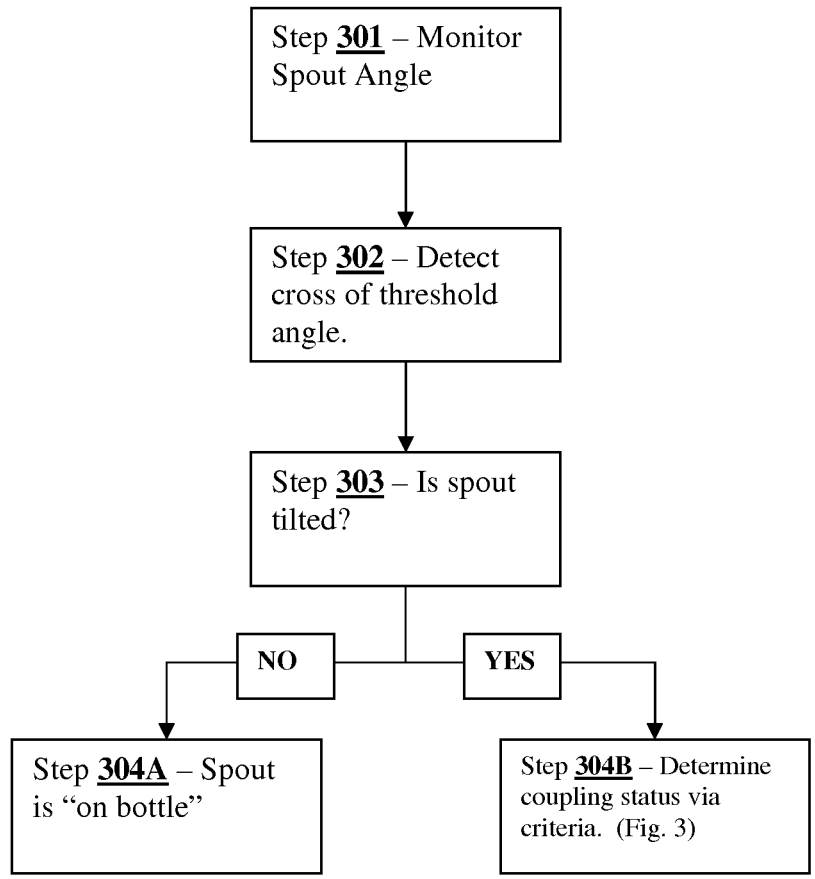
FIG. 3 provides a flowchart illustrating a process of detecting a spout coupling status, according to embodiments of the inventive subject matter.

FIG. 3 is a flowchart illustrating a process of detecting on-bottle and off-bottle conditions, according to embodiments of the inventive subject matter. For the process illustrated in FIG. 3, it is assumed that two sets of spout coupling criteria have already been obtained by the processor 102. The first spout coupling criteria includes rules whereby the microprocessor 102 determines that a spout is "off bottle" if the spout is at an angle greater than 45 degrees from vertical for longer than 30 seconds. The second spout coupling criteria includes rules whereby the microprocessor 102 determines that a spout is "off bottle" if it is within 15 degrees of horizontal for more than 10 seconds.

At step 301, the accelerometer 101 monitors the angle of the spout. This monitoring can be performed by sampling/measuring the angle at a rate according to a desired monitoring frequency. During the repeated monitoring at step 301, the microprocessor 102 is in a sleep state, remaining active to a capacity necessary to receive an interrupt output signal from the accelerometer 101 and recognize an interrupt output signal state change. In embodiments, the interrupt output signal from the accelerometer 101 is sent to the microprocessor 102 only upon crossing a threshold. In other embodiments, accelerometer 101 can also output an interrupt output signal to the microprocessor 102 periodically, for each measured angle, etc.

At step 302, the accelerometer 101 detects that the spout has crossed a threshold angle relative to vertical, and the accelerometer 101 interrupt output changes state.

At step 303, in response to the accelerometer interrupt line changing state, the microprocessor 102 wakes up and determines whether the angle of the spout is more or less than the threshold angle for a tilt. For the purposes of this example, the threshold angle is considered to be 45 degrees from vertical. Thus if the angle is less than 45 degrees, the microprocessor 102 determines that the spout is "not tilted". If the angle is greater than or equal to 45 degrees off-vertical, the microprocessor determines that the spout is in a "tilted" state.

While the microprocessor 102 is awake, it is continuously monitoring the angle detected by the accelerometer 101. The accelerometer 101 can provide measurements to the microprocessor 102 according to a desired frequency (e.g., 25 times per second).

It is important to note that the change in interrupt output can occur when crossing the threshold angle in both directions. In other words, if an accelerometer 101 has an interrupt output of state "A" for angles less than a threshold angle and an interrupt output of state "B" for angles greater than or equal to the threshold angle, then a change in angle from less than the threshold angle to an angle greater than the threshold angle will cause a change from interrupt output A to interrupt output B. Likewise, if the change is from an angle greater than the threshold angle to an angle less than the threshold angle, then the accelerometer's interrupt output will change from state B to state A. If the microprocessor 102 is in a sleep state, either change in state will cause the microprocessor 102 to wake up.

At step 304A, if the state of the spout is "not tilted", the microprocessor checks whether the previous state was "on bottle" or "off bottle". If the previous state is "on bottle", the microprocessor 102 goes back to a sleep state. If the spout's previous state was "off bottle", the microprocessor 102 changes the state to "on bottle", transmits a packet to the central system indicating the spout as "on bottle", and goes back to a sleep state.

A "tilted" state of the spout can be indicative of a pour occurring or that the spout is "off bottle". Thus, at step 304B, if the state of the spout is "tilted", the microprocessor detects whether the spout is "off bottle" according to one or more spout coupling criteria.

Figure 4:
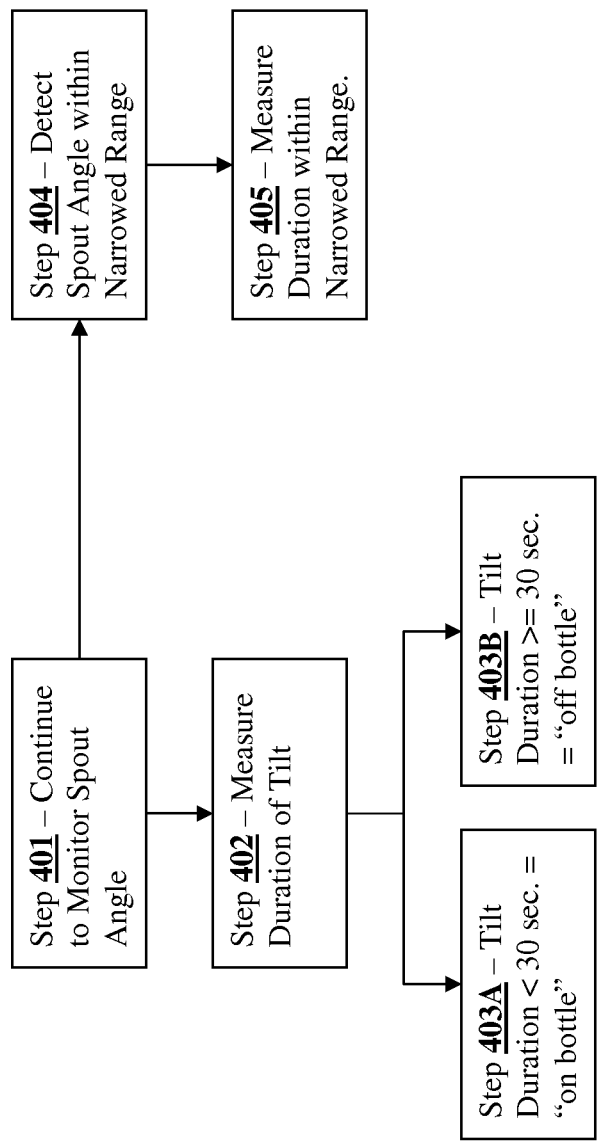
FIG. 4 provides a flowchart illustrating steps of the process of FIG. 3 in greater detail, according to embodiments of the inventive subject matter.

FIG. 4 provides examples of processes executed to determine the spout coupling state according to spout coupling criteria at step 304B.

The first spout coupling criteria illustrated in FIG. 4 determines a spout coupling status based on the threshold angle of tilt determining a state of "tilted" (determined at step 303) and a duration of tilt. In this example, the threshold angle is 45 degrees from vertical, whereby the spout is determined to be "off-bottle" if the spout remains at an angle greater than 45 degrees for longer than 30 seconds.

As discussed above, the systems and methods of the inventive subject matter can be incorporated into spouts that use accelerometers for the purposes of tracking pouring events and pouring amounts. Thus, the threshold angle of the spout coupling criteria can correspond to the angle used to trigger the start and/or end of a "pour event" in the pour monitoring system. In these embodiments, the angle selected can be one that is suitable for both the pour event triggering functions and for the determination of the spout coupling state. Likewise, the duration of the tilt according to the spout coupling criteria can be set such that it will exceed the maximum amount of time a pour can take while being short enough to capture "off-bottle" occurrences of relatively short duration.

At step 401, the accelerometer 101 continues to monitor the angle of the spout. In embodiments, the frequency of monitoring can be the same frequency as prior to crossing the threshold. In embodiments, the frequency of monitoring can be of a greater frequency than the frequency used prior to crossing the threshold.

At step 402, upon determining that the spout is "tilted" at step 303, the system 100 begins measuring the duration of the tilt, which is a measurement of the amount of time elapsed since the spout crossed the threshold angle (in this example, 45 degrees). The duration of the tilt can be measured via clock functions of the microprocessor 102 or via clock 103.

At step 403A, if the threshold angle is crossed again prior to a tilt duration of 30 seconds such that the spout goes back to a state of "untilted", the microprocessor 102 determines a spout coupling state of "on bottle" (e.g., reflecting that the tilt was due to a pour or a dropped bottle, whereby the crossing of the threshold prior to the 30 second limit of the spout coupling criteria indicates that the pour has finished or that the bottle has been picked up and put back in place vertically). In embodiments, the microprocessor 102 can generate a spout coupling state message indicating an "on bottle" status and transmit it to the central system, after which the microprocessor 102 goes back to sleep. In embodiments, the microprocessor can first check the prior coupling state. If the prior coupling state was "on bottle", the microprocessor 102 simply goes back to sleep without transmitting a message. If the prior coupling state was "off bottle", the microprocessor 102 can change the spout coupling state to "on bottle", transmit a message to the central system indicating the spout coupling state change, and then go to sleep.

At step 403B, if the spout remains tilted for more than 30 seconds, the microprocessor 102 determines a spout coupling status of "off bottle", generates the spout coupling status message indicating as such, and transmits the message to the central system. After transmitting the message, the microprocessor 102 goes back to a sleep state.

The second spout coupling criteria for this example described above determines whether the spout has been removed and is laying flat (such as on the bar) for a short period of time (such as if it is removed by a bartender from an empty bottle and laid on the bar in preparation for inserting into a new bottle).

In this example, the angle used for the second coupling criteria is within 15 degrees of horizontal. Other suitable angle ranges can include from 10-20 degrees from horizontal, and can be selected according to a desired balance between sensitivity and noise tolerance (e.g., vibrations on the surface the spout is lying on). In embodiments, the angle range used for this criteria (i.e., to determine if the spout is lying flat on a surface) can be dependent on the shape of the spout housing. For example, if the spout is shaped such that when it is placed on a flat surface, the accelerometer 102 becomes oriented at an angle relative to horizontal, then the angle range is a narrowed angle range relative to and around this "at rest" angle of the accelerometer 102 Likewise, if the housing of the spout has a shape whereby it is more likely to rest on a particular side versus other sides of the housing, the angle and or time required to generate the "off-bottle" coupling status can be adjusted to account for each side. Thus, for a narrow side of the spout that is not a typical "at rest" position for a removed spout, the time required to generate an "off-bottle" status can be longer than for a more natural "at rest" side of the spout (e.g., since it is less likely that the spout will be removed and placed on a flat surface on an edge, the criteria can increase the time to account for the possibility that the spout is still attached to a bottle that is lying on its side).

At step 404, the system monitors the angles of the spout while it is tilted, and detects that the angle of the spout is within 15 degrees of horizontal (either positive or negative, thus a 30 degree total angle range).

In embodiments, the detection can be made by the accelerometer 101 changing its interrupt output to a third state corresponding to this narrow angle range of within 15 degrees of horizontal. In these embodiments, the microprocessor 102 can be programmed to wake up from sleep in response to the change from a second interrupt output state (if the spout was already at an angle greater than 45 degrees from vertical and the processor 102 in a sleep state) to the third interrupt output state. Alternatively, the microprocessor 102 can be programmed to ignore this state change and only react to it while already awake.

In embodiments, an already-awake microprocessor 102 can be programmed to make this distinction (the crossing of the 15 degree threshold) based on the periodic angle measurements from the accelerometer 101, without requiring the accelerometer 101 to change its interrupt output state. Thus, in these embodiments, the microprocessor 102 is not awoken solely by crossing the 15 degree-from-horizontal threshold.

At step 305, the system (via microprocessor 102 or clock 103) begins to measure the duration at which the spout is within this narrowed angle threshold.

If the spout stays within the narrowed angle threshold for 10 seconds or more, the microprocessor 102 determines that the spout coupling state is "off bottle" at step 406, generates the spout coupling state message indicating the "off bottle" condition, transmits the message to the central system, and goes to sleep.

If the spout's angle changes such that it leaves the narrowed angle threshold before the 10 seconds, the measured duration is within the narrowed angle threshold is disregarded. Having the spout's angle change such that it no longer is within the narrowed angle threshold within the 10 seconds does not automatically mean that the spout is "on bottle" because the spout can still remain beyond the 45 degrees from vertical threshold for over 30 seconds.

Conversely, the determination of an "off bottle" condition at step 406 results in a transmission of the "off-bottle" message even if the spout has not yet been tilted for the 30 seconds required by the first spout coupling criteria. Thus, this determination of "off-bottle" according to the second coupling criteria effectively serves to override the concurrent first coupling criteria.

In embodiments where the spout is also programmed to monitor pour events and determine pour amounts, the microprocessor 102 can further be programmed to "zero out" the pour event upon determining an status of "off-bottle" at step 403B or step 406.

In embodiments, the microprocessor 102 is further programmed to wake from sleep periodically (e.g., every 10 hours, 16 hours, 24 hours, etc.), in the event that no events have occurred that would trigger a change in the angle that would result in the microprocessor 102 awakening. This periodic timer can be maintained by the clock 103 or by timekeeping functions of the processor 102. Upon awakening based on this periodic check, the microprocessor 102 can determine a spout coupling status using one or more spout coupling criteria. Upon determining a spout coupling status, the microprocessor 102 can generate the spout coupling status message and transmit it to the central system. After transmitting the spout coupling status message to the central system, the microprocessor 102 returns to sleep mode.

As discussed above, the systems and methods of the inventive subject matter can be incorporated into spouts that use accelerometers for the purposes of tracking pouring events and pouring amounts. In these embodiments, the angles and duration requirements of spout coupling criteria can also be based on attributes such as the size (e.g. material capacity) of the container, shape of the container, material being dispensed (e.g., properties of the material such as viscosity, pour rate for a particular container, etc.), and a determined amount of material remaining in the container. For example, where a container is particularly large, a material particularly slow to pour, and/or where a large amount of material is present pre-tilting (e.g., a nearly full bottle), the microprocessor 102 can increase the time prior to reporting a status of "off-bottle" to account for a larger pour time of the materials from the bottle Likewise, for a nearly full bottle, the threshold angle to indicate a "tilted" state of the spout can be set to a smaller angle from vertical, as the bottle requires less of an angle to begin dispensing material (and conversely, for nearly empty bottles, the threshold angle can be increased to account for a larger required tilt angle to get the material out of the bottle).

In embodiments, the threshold angle required to go from a state of "untilted" to "tilted" (to trigger a change in the interrupt output state of the accelerometer 101 when going beyond the threshold angle) can be different than the threshold angle to return to the "untilted" state. In further embodiments, this second threshold angle can function as a "reset" of the spout coupling criteria without resulting in a return to the "untilted" state. For example, for a spout pouring criteria, the threshold angle to determine a "tilted" state can be 30 degrees from vertical. In a multiple-pour event, a bartender may hold the bottle beyond the 30 degree mark for longer than the duration allowed by the criteria (e.g. 30 seconds) due to the need to transition between multiple glasses and to initiate and finish a pour for each glass. Thus, in these embodiments, a second threshold angle (e.g. 50 degrees from vertical) can be set such that with each passing of the second threshold, the measured duration of the tilt is reset. As such, if, after 30 seconds since the last passing of the second threshold angle, the bottle has not returned past either the first or second threshold angle, the microprocessor 102 determines an "off-bottle" status, transmits the corresponding spout coupling status message and, optionally, returns to sleep.

In embodiments, spout coupling criteria can use attributes such as container size and shape in the determination of a spout coupling status. The container size and shape attributes in these embodiments can be used to determine whether, for a spout tilt angle and duration that would otherwise result in a status of "off-bottle", the spout is in fact still attached to a bottle that has been dropped and is rolling. In these embodiments, the microprocessor 102 can be programmed such that, if the angles reported by the accelerometer follow a pattern known to correspond to a rolling bottle of the size and shape indicated by the attributes, the microprocessor 102 can generate an "on-bottle" spout coupling message. In the message, the microprocessor 102 can also include a special status indicator that indicates the rolling bottle, such as to alert personnel.

In embodiments, the system 100 can detect on-bottle and off-bottle conditions by monitoring the acceleration along the vertical axis of the spout. Removing the spout, for example, will produce a large, brief positive acceleration as the spout breaks free of the container (bottle), followed by a negative acceleration. Inserting the spout will produce a negative acceleration, followed by an even briefer positive acceleration as the spout "bottoms out" against the container (bottle). These acceleration profiles can be used to detect on-bottle and off-bottle conditions. They can be used either by themselves or in conjunction with the angle method described above.

The spout status message can further include a flow rate. Flow rate can be dependent upon bottle angle, amount of fluid remaining in the bottle, fluid viscosity, fluid density or other properties. Container (bottle) shape can also affect flow rate, although to a lesser degree. In distilled spirits, density or viscosity are dependent upon ethanol percentage ("proof"), or temperature. In liqueurs or cordials, viscosity is also dependent upon sugar content and the other additives to the ethanol/water mixture. One should appreciate that the spout status message can include additional information relating to the spouts environment. For example, the additional information can include temperature data, battery levels, spout age, number of uses, moisture content in the electronics chamber (indicative of damage), ambient sensor data, or other information available to the spout. A moisture content could be measured based on a conductor pattern as a function of a signal from an analog to digital converter.

To determine average pour rate vs. angle, a given fluid and its container (bottle), can be mounted at a fixed angle, and the time to empty the container can be measured. This gives an average flow rate (units per second). This measurement can be repeated at a number of fixed angles (from fully inverted to horizontal) to give a table or chart of flow rate versus angle for this particular fluid. Making the same measurements over the temperature range of interest will enable an adjustment for the effects of temperature upon fluid density and viscosity. Thus, the flow table can depend on a temperature, viscosity, container shape, percentage of alcohol, amount of sugar, and an amount of material in a container.

In operation, the accelerometer measures the pour angle at regular intervals (for example, every 0.1 seconds). Because the pour angle and the temperature and the fluid are known, the pour rate for each interval is also known, and can be looked up from a table or calculated from an equation. The total pour is the sum of (pour rate×sample interval) for all of the sample intervals in the pour.

Measuring the time required to empty the container, as detailed above, gives an average pour rate for that container. The accuracy for each individual pour can be further improved by correcting for the level of fluid in the container. The pour measurements versus angle (and temperature) can also be made for various levels in the bottle. This data can be stored in either a table or an equation, as with the average pour rate for the entire bottle. When a spout is detected as being removed from the bottle and re-inserted, as described above, this can be used a signal that the bottle is full. Because the fluid and container are known, the number of ounces/milliliters in the container is also known. The software can keep track of how much fluid has been poured from the container (and how much remains). This enables the software to look up the pour rate versus remaining fluid in the container, and calculate the poured volume more accurately by using pour rates that correspond to the level of fluid in the container.

Although the above disclosed subject matter relates to beverage containers (e.g., liquors, cordials, wine, etc.), on should appreciate that inventive subject matter can also be directed to other embodiments. Example embodiments that can leverage the above subject matter include the following:

In medicinal applications, whereby the disclosed techniques are applied to medicinal containers. Such an approach aids in ensuring that liquid medications are properly dispensed or sealed.

Using the spout for containers having hazardous chemicals, such as cleaning fluids. For example, in a hospitality setting where cleaning fluids are used, a manager can determine the rate at which the fluids are used to ensure costs are maintained.

In fuel containers (e.g., gasoline cans, etc.), the use of a spout implementing the inventive subject matter can be used to avoid dangerous spills.

The spout of the inventive subject matter can further be used with containers used to dispense powders.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A dispensing spout comprising:
    a tilt sensor configured to generate an orientation attribute having an orientation attribute value, wherein the orientation attribute value comprises an instant measured orientation angle of the spout with respect to a reference orientation; and
    a detector circuit coupled with the tilt sensor, the detector circuit having a processor programmed to:
        derive a duration attribute having a duration attribute value, wherein the duration attribute value comprises a measured duration of time of the spout at a particular instant measured orientation;
        obtain a spout coupling criteria defined as a function of the orientation attribute and the duration attribute, wherein the spout coupling criteria is satisfied if the orientation attribute value generated by the tilt sensor exceeds a threshold angle for a particular duration;
        generate a detected profile as a function of the orientation attribute value and the duration attribute value; and
        generate a spout coupling state message upon the detected profile satisfying the spout coupling criteria, wherein the spout coupling state message provides an indication of the spout being off of a container.

2. The spout of claim 1, wherein the duration attribute value is at least 10 seconds.

3. The spout of claim 1, wherein the duration attribute value is at least 25 seconds.

4. The spout of claim 1, wherein the threshold angle is at least 10 degrees off vertical.

5. The spout of claim 4, wherein the threshold angle is at least 15 degrees off vertical.

6. The spout of claim 1, further comprising a wireless transmitter coupled with the detector circuit.

7. The spout of claim 6, wherein the detector circuit is further programmed to cause the wireless transmitter to transmit the spout coupling state message.

8. The spout of claim 6, wherein the wireless transmitter adheres to at least one of the following transmission formats: 802.11, Bluetooth, Zigbee, WiMAX, WiGIG, a proprietary serial format, and RFID.

9. The spout of claim 1, wherein the tilt sensor comprises an accelerometer.

10. The spout of claim 1, wherein the reference orientation comprises a relative angle with respect to a container orientation of the container to which the spout is coupled.

11. The spout of claim 10, wherein the container comprises at least one of the following: a bottle, a medication container, a carton, a collection tube, a flask, and a vessel.

12. The spout of claim 10, wherein the reference orientation comprises a vertical orientation relative to the container.

13. The spout of claim 1, further comprising a power source coupled with the tilt sensor and the detector circuit.

14. The spout of claim 1, further comprising a memory storing the spout coupling criteria.

15. The spout of claim 1, wherein the spout coupling criteria is defined as a function of acceleration of the spout.

16. The spout of claim 1, wherein the spout coupling criteria is further defined as a function of at least one of the following: a time, a velocity, a position, a movement path, and a movement signature.

17. The spout of claim 1, wherein the spout coupling criteria is satisfied if the orientation of the spout exceeds the threshold angle and is within a specified angle range for the particular duration.

18. The spout of claim 17, wherein the specified angle range is within 15 degrees of horizontal.

* * * * *